United States Patent
Tomita et al.

(10) Patent No.: US 10,001,324 B2
(45) Date of Patent: Jun. 19, 2018

(54) METHOD OF OPERATING ELECTRIC ARC FURNACE

(71) Applicant: DAIDO STEEL CO., LTD., Nagoya-shi, Aichi (JP)

(72) Inventors: Noriyuki Tomita, Aichi (JP); Yoshikazu Tanaka, Aichi (JP)

(73) Assignee: DAIDO STEEL CO., LTD., Aichi (JP)

(*) Notice: Subject to any disclaimer, the term of this patent is extended or adjusted under 35 U.S.C. 154(b) by 280 days.

(21) Appl. No.: 14/930,793

(22) Filed: Nov. 3, 2015

(65) Prior Publication Data
US 2016/0123665 A1   May 5, 2016

(30) Foreign Application Priority Data

Nov. 5, 2014   (JP) .................. 2014-225631

(51) Int. Cl.
*F27D 3/00* (2006.01)
*F27B 3/08* (2006.01)
(Continued)

(52) U.S. Cl.
CPC ............ *F27D 3/0025* (2013.01); *F27B 3/085* (2013.01); *F27B 3/10* (2013.01); *F27B 3/12* (2013.01);
(Continued)

(58) Field of Classification Search
CPC .... F27D 3/0025; F27D 3/0027; F27D 3/0032; F27D 3/0033; F27D 3/06; F27D 3/15; F27D 3/1509; F27D 11/00; F27D 11/08; F27D 2099/0095; F27D 2099/0098; F27B 3/04; F27B 3/06; F27B 3/065;
(Continued)

(56) References Cited

U.S. PATENT DOCUMENTS

| 1,378,972 A | 5/1921 | Moore |
| 2,686,961 A | 8/1954 | Ellefsen |

(Continued)

FOREIGN PATENT DOCUMENTS

| JP | 60-122886 | 7/1985 |
| JP | 2014-40965 | 3/2014 |

OTHER PUBLICATIONS

U.S. Appl. No. 14/930,775 to Noriyuki Tomita et al., filed Nov. 3, 2015.

(Continued)

*Primary Examiner* — Hung D Nguyen
(74) *Attorney, Agent, or Firm* — Greenblum & Bernstein, P.L.C.

(57) ABSTRACT

A method of operating an electric arc furnace containing a furnace shell having a tapping hole, a plurality of electrodes, and a rotating apparatus that rotates the furnace shell around a vertical axis relative to the electrodes, the method contains a charging step of opening an opening-and-closing door of a scrap bucket containing a metal material and falling the metal material into the furnace shell in which the furnace shell is rotated by the rotating apparatus until a direction of a line connecting a center of the furnace shell to a center of the tapping hole intersects an extension direction of a seam at a closing side of the opening-and-closing door, the opening-and-closing door is opened in this positional relationship to charge the metal material.

4 Claims, 10 Drawing Sheets

(51) Int. Cl.
*F27B 3/10* (2006.01)
*F27B 3/12* (2006.01)
*F27B 3/18* (2006.01)
*F27D 11/08* (2006.01)
*F27B 5/14* (2006.01)
*F27D 99/00* (2010.01)

(52) U.S. Cl.
CPC .............. *F27B 3/183* (2013.01); *F27D 11/08* (2013.01); *F27B 2005/143* (2013.01); *F27D 2099/0098* (2013.01)

(58) Field of Classification Search
CPC .... F27B 3/085; F27B 3/10; F27B 3/12; F27B 3/18; F27B 3/183; F27B 3/186; F27B 3/19; F27B 3/225; F27B 2005/143
USPC ..................................... 373/79–85; 75/10.34
See application file for complete search history.

(56) References Cited

U.S. PATENT DOCUMENTS

| | | | |
|---|---|---|---|
| 2,907,807 A | 10/1959 | Noesen | |
| 3,237,930 A | 3/1966 | Hofmann | |
| 3,955,964 A * | 5/1976 | MacDonald | C21C 5/5252 164/469 |
| 3,980,801 A | 9/1976 | Milasius | |
| 4,110,546 A | 8/1978 | Stenkvist | |
| 4,638,487 A * | 1/1987 | Tomizawa | C21B 13/12 266/158 |
| 4,662,526 A | 5/1987 | Schaller | |
| 4,679,773 A | 7/1987 | Wunsche | |
| 4,694,465 A * | 9/1987 | Nanjo | C21C 5/527 373/81 |
| 5,153,894 A | 10/1992 | Ehle et al. | |
| 5,264,020 A * | 11/1993 | Ehle | C21O 5/5252 373/80 |
| 5,756,957 A | 5/1998 | Titus et al. | |
| 6,274,081 B1 * | 8/2001 | Fuchs | C21O 5/527 373/79 |
| 6,377,605 B1 | 4/2002 | McCaffrey | |
| 2002/0110175 A1 | 8/2002 | Stercho | |

OTHER PUBLICATIONS

U.S. Appl. No. 14/930,823 to Kota Mizutani et al., filed Nov. 3, 2015.
U.S. Appl. No. 14/930,809 to Kota Mizutani et al., filed Nov. 3, 2015.
Official Action issued in U.S. Appl. No. 14/930,809 dated Jul. 28, 2017.
Official Action in U.S. Appl. No. 14/930,809 dated Jan. 13, 2017.
Office Action issued in Counterpart U.S. Appl. No. 14/930,775, dated Dec. 18, 2017.
Office Action issued in Counterpart U.S. Appl. No. 14/930,823, dated Dec. 21, 2017.
Office action dated Apr. 12, 2018 issued in corresponding Taiwanese patent application No. 104136523, and translation.
Office action dated Apr. 12, 2018 issued in corresponding Taiwanese patent application No. 104136524, and translation.

* cited by examiner

*Prior Art*

FIG. 9B

*Prior Art*

METHOD OF OPERATING ELECTRIC ARC FURNACE

FIELD OF THE INVENTION

The present invention relates to a method of operating an electric arc furnace, and specifically, relates to a method of operating an electric arc furnace with a rotating apparatus that rotates a furnace shell relative to an electrode.

BACKGROUND ART OF THE INVENTION

Conventionally, a three-phase alternating current arc furnace in which arcs are produced between a metal material in a furnace shell and three electrodes inserted into the furnace shell to melt the metal material by arc heat is widely used as a melting furnace for melting metal materials such as metal scrap.

In an operation of melting a metal material using such an electric arc furnace, conventionally, a scrap bucket is widely used as a means for charging the metal material into the furnace shell.

Figure 9A:
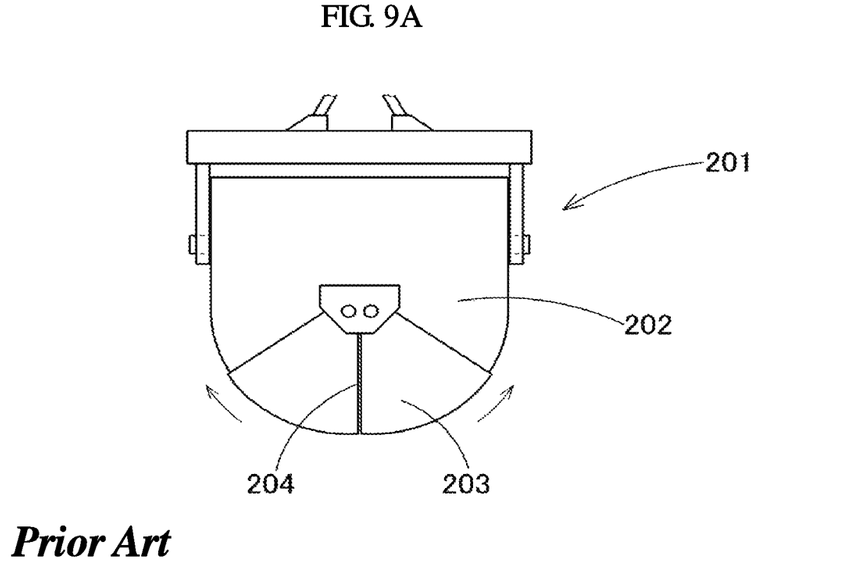
FIG. 9A and FIG. 9B are views explaining unmelted residue of a metal material in an EBT furnace.
Figure 9B:
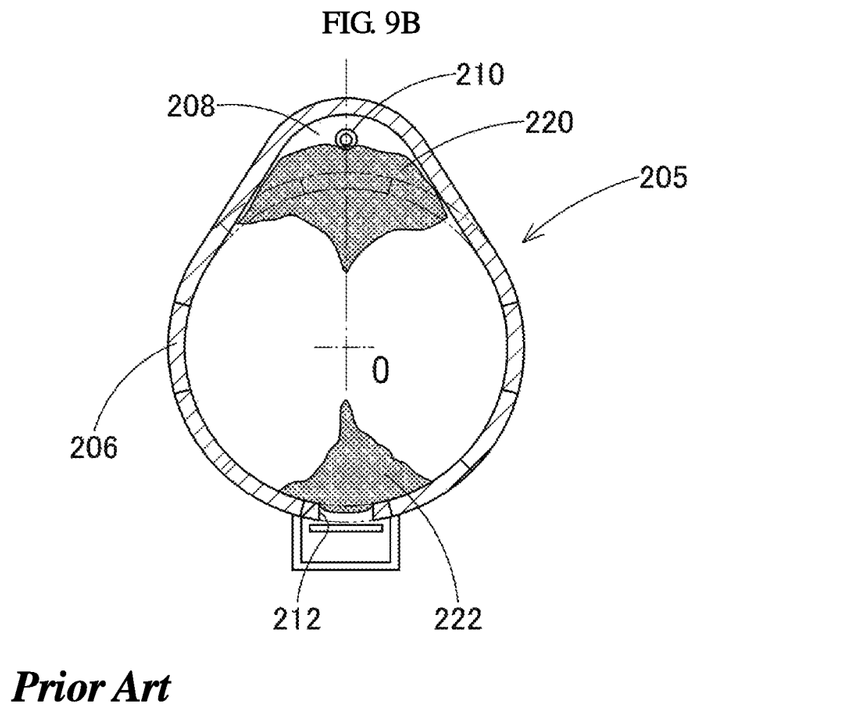

FIGS. 9A and 9B schematically illustrate a situation in which the metal material is charged into the furnace shell.

A reference numeral 201 represents a scrap bucket which has a circular cylindrical trunk portion 202 as a body in an upper portion, and an opening-and-closing door 203 that is opened while being split in half at the center to either side in a bottom portion.

A metal material is charged into an electric arc furnace 205 in such a manner that the metal material is put into the scrap bucket 201, this is conveyed to a position above the electric arc furnace 205, and the opening-and-closing door 203 on the bottom portion is opened by being split in half at the center to either side.

At this time, the metal material in the scrap bucket 201 falls downwards via an opening that is formed by opening the opening-and-closing door 203 on the bottom portion, and is charged into a furnace shell below the scrap bucket 201.

A metal material may contain a powdery material.

For example, in a case where a scrap material such as ferrous scrap is used as the metal material, the scrap material may contain a large plate-like scrap, or a fine powdery scrap.

The powdery scrap may include metal cutting chips such as lathe chips, or scrap that is produced by pulverizing the metal cutting chips further finely.

In the case where a metal material contains such a powdery material, the powdery metal material is likely to sink down to the bottom in the scrap bucket, to move to a seam 204 at a tip end of the half split opening-and-closing door 203 and the vicinity thereof, to gather therearound.

In this case, when the opening-and-closing door 203 on the bottom portion of the scrap bucket 201 is opened into two pieces so as to charge the metal material into a furnace shell 206 of the electric arc furnace 205, the powdery material, which gathers in the vicinity of the seam 204 at the tip end of the opening-and-closing door 203, falls downwards into the furnace shell 206 while spreading via a slit that is formed by an opening operation of the opening-and-closing door 203, that is, a gap (that is, an opening with a narrow width at an initial time of opening).

In this case, if an extension direction of the seam 204 of the half split opening-and-closing door 203 of the scrap bucket 201, that is, an extension direction of a tip end at an closing side of the door coincides with a direction connecting a center O of the furnace shell 206 to the center of a tapping hole 210, that is, if the furnace shell 206 and the scrap bucket 201 are in such a positional relationship (the scrap bucket transported by a ceiling crane and the furnace shell are likely to be in such a positional relationship due to facility layout or the like), there arises a problem that the powdery metal material falling into the furnace shell 206 while spreading is likely to accumulate in the vicinity of the tapping hole 210 of the furnace shell 206.

In particular, in the case where the electric arc furnace 205 is an eccentric bottom tapping electric arc furnace (EBT furnace), the aforementioned problem is more likely to occur. Specifically, in the case of an EBT furnace which has the furnace shell 206 having a furnace bottom portion partially protruding outwards further than an outer surface of a circular circumferential wall portion of the furnace shell 206 in a radial direction to form a shelf-like protruding portion 208 with a small gradient, and has the tapping hole 210 (the tapping hole is blocked with a cover at the outside on a lower side of the protruding portion) provided in the protruding portion 208 while passing therethrough in a vertical direction, the aforementioned problem is more likely to occur.

The reason for this is considered that the shelf-like protruding portion 208 is likely to serves as a receiving portion for the powdery metal material.

In the drawing, a reference numeral 220 represents the accumulating powdery metal material.

It is considered that the powdery metal material 220 accumulating in the vicinity of the tapping hole 210 in such a way is seemingly easy to be melted due to its fineness. However, actually, when the powdery metal material 220 is heated, particles are surface-fused to bond each other, and turn into an ingot (sintered compact). Heat is unlikely to be transferred to the inside of the ingot. In addition, the ingot is positioned at a location distant from an electrode and hard to be melted. Therefore, there arises a problem that the ingot is likely to remain unmelted In a case where a slag door 212 is provided at a position that is opposite to the tapping hole 210 in a radial direction, the powdery metal material is also likely to accumulate in the vicinity of the slag door 212.

The powdery metal material 222 accumulating in the vicinity of the slag door 212 is likely to cause a problem of turning into an uneasy-to-melt material (powder compact material) due to air infiltrating into the furnace or the like during the discharge of slag.

Patent Document 1 and Patent Document 2 disclose an electric arc furnace, in which the furnace shell is rotated relative to the fixed electrode.

This electric arc furnace with a rotating apparatus is intended to solve the problem of non-homogenous melting between hot spot and cold spot by rotating the furnace shell relative to the electrode to move the position of the metal material originally placed at a cold spot to a hot spot, and the metal material originally placed at a hot spot to a cold spot (for example, the furnace shell is rotated relative to the electrode by approximately 60° in a circumferential direction, whereby the electrode originally positioned in a center region in the circumferential direction of a hot spot is moved to a center region in the circumferential direction of an adjacent cold spot).

The electric arc furnace with this rotating apparatus is intended to solve the non-homogenous melting of the metal material at hot and cold spots by rotating the furnace shell relative to the electrode while the metal material is melted, and thus moving the metal material at a cold spot to a hot spot, and the metal material at a hot spot to a cold spot (the furnace shell is rotated relative to the electrode by approximately 60° in a circumferential direction, and thus the electrode, positioned in a center region of a hot spot in the circumferential direction, is moved to a center region of an adjacent cold spot in the circumferential direction).

However, these Patent Documents disclose neither the new task of the present invention nor any means for solving the problem. Therefore, they are clearly different from the present invention.

Patent Document 1: JP-A-S60-122886
Patent Document 2: JP-A-2014-40965

SUMMARY OF THE INVENTION

The present invention has been made in light of these circumstances. An object of the present invention is to provide a method of operating an electric arc furnace which can effectively solve the problem that when a metal material is charged into a furnace shell from a scrap bucket, mainly a powdery metal material accumulates in the vicinity of a tapping hole and remains unmelted.

That is, the present invention provides a method of operating an electric arc furnace, in which the electric arc furnace contains: (a) a furnace shell that includes a cylindrical circumferential wall portion, a furnace bottom portion and a tapping hole; (b) a furnace roof that has a plurality of electrodes provided so as to face downwards; and (c) a rotating apparatus that rotates the furnace shell around a vertical axis relative to the electrodes, in which the method contains: a charging step of, above the furnace shell, opening an opening-and-closing door on a bottom portion of a scrap bucket, which contains a metal material, to form an opening, and falling the metal material into the furnace shell via the opening; and a melting step of melting the metal material, and in which the furnace shell is rotated by the rotating apparatus until achieving a positional relationship in which a direction of a line connecting a center of the furnace shell to a center of the tapping hole intersects an extension direction of a seam at a closing side of the opening-and-closing door of the scrap bucket, then the opening-and-closing door of the scrap bucket is opened in this positional relationship, and the metal material is charged.

The furnace shell may further contain a slag door provided on the line connecting the center of the furnace shell to the center of the tapping hole.

The method of operating an electric arc furnace may further contain a rotating step of rotating the furnace shell during the melting step after the charging step.

As described above, in the method of operating an electric arc furnace according to the present invention, a furnace shell is made rotate by a rotating apparatus until achieving a positional relationship in which a direction of a line connecting a center of the furnace shell to a center of a tapping hole intersects an extension direction of a seam at a closing side of an opening-and-closing door of a scrap bucket, and then makes the opening-and-closing door open in this positional relationship to perform charging of a metal material. According to the present invention, since the position to which a powdery metal material falls from the scrap bucket is separated and deviates in the circumferential direction from the position of the tapping hole of the furnace shell (position in a plan view), it can prevent the powdery metal material falling from the scrap bucket from accumulating in the vicinity of the tapping hole in a large amount. Accordingly, it is possible to solve the problem that the powdery metal material accumulates in the vicinity of the tapping hole and remains unmelted during melting.

In the present invention, the step of charging the metal material is preferably performed in a positional relationship in which the direction of the line connecting the center of the furnace shell to the center of the tapping hole intersects the extension direction of the seam at the closing side of the opening-and-closing door of the scrap bucket at an angle of 10° or greater, preferably an angle of 30° or greater, and more preferably an angle of 60° or greater.

In the present invention, particularly in the case where the furnace shell further contains a slag door provided on the line connecting the center of the furnace shell to the center of the tapping hole, by rotating the furnace shell, the position to which a powdery metal material falls from the scrap bucket deviates from not only the position of the tapping hole but also the position of the slag door. As a result, it can prevent the powdery metal material falling from the scrap bucket from accumulating in a large amount not only in the vicinity of the tapping hole but also in the vicinity of the slag door at the same time.

According to the aspect of the present invention, the slag door is particularly provided on the extension of the line connecting the center of the furnace shell to the center of the tapping hole (claim 2), and the furnace shell is rotated, and thus the position to which the powdery metal material falls from the scrap bucket deviates from not only the position of the tapping hole but also the slag door. As a result, a large amount of the powdery metal material falling from the scrap bucket can be simultaneously prevented from accumulating in the vicinities of not only the tapping hole but also the slag door.

In the present invention, a rotating step of rotating the furnace shell is preferably performed during the melting step after the charging step.

In this manner, the metal material originally placed at a cold spot can be moved to a hot spot, and the metal material originally placed at a hot spot can be moved to a cold spot. As a result, the metal material can be uniformly melted in the furnace shell.

According to the present invention, it is possible to provide a method of operating an electric arc furnace which can effectively solve the problem that when a metal material is charged into a furnace shell from a scrap bucket, mainly a powdery metal material accumulates in the vicinity of a tapping hole and remains unmelted.

DETAILED DESCRIPTION OF THE INVENTION

Hereinafter, embodiments in which the present invention is applied to an electric arc furnace melting a metal material (herein, steel material) will be described in detail with reference to the drawings.

Figure 1:
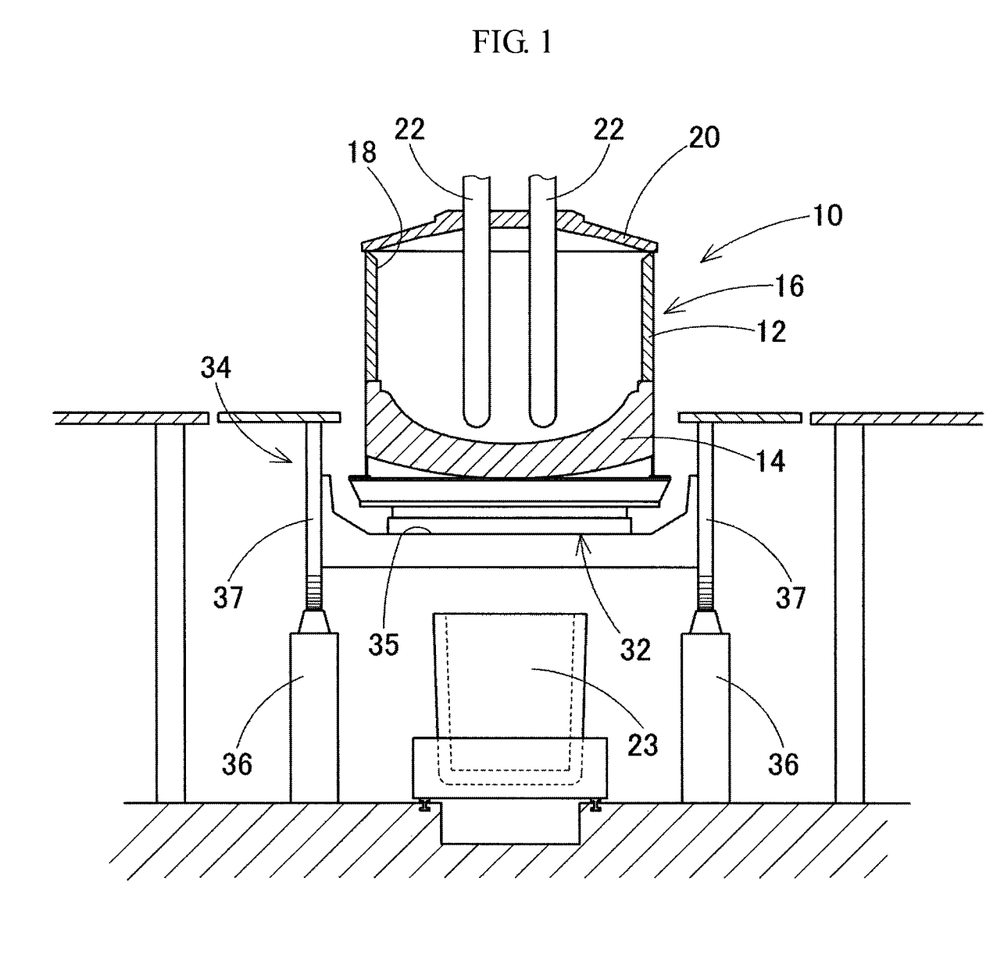
FIG. 1 is a view illustrating a configuration of an electric arc furnace that is used in an operation method in one embodiment of the present invention.
Figure 2:
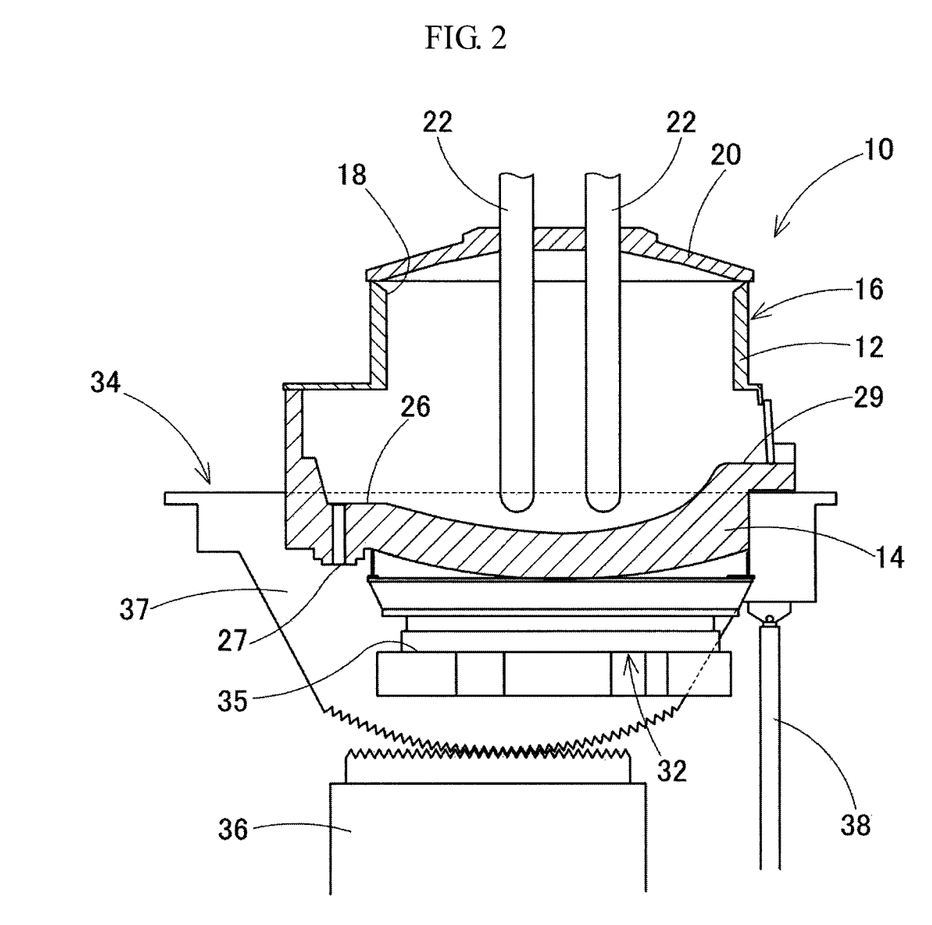
FIG. 2 is a view illustrating another cross-section of the electric arc furnace in FIG. 1.

FIG. 1 and FIG. 2 are views illustrating a configuration of the electric arc furnace that is used in an operation method in the present embodiment.

In FIG. 1, a reference numeral 10 represents an electric arc furnace, which includes a furnace shell 16 that includes a cylindrical (herein, circular cylindrical) circumferential wall portion 12, a furnace bottom portion 14 and a charging opening 18; a furnace roof 20 that openably and closably shuts the charging opening 18 at an upper end of the furnace shell 16; and three electrodes 22 which are inserted downwards into the furnace shell 16 while passing through the furnace roof 20.

Each of the electrodes 22 is disposed close to the center of the furnace roof 20 with a substantially circular shape in a plan view, while being equally spaced (at an interval of 120°) around a center axis of the furnace shell 16. The electrodes 22 are supported by a lifting apparatus, which is not illustrated, in such a way that the height thereof is independently adjustable. That is, the electrodes 22 are constituted in such a way that the vertical separation distance between a lower end of the electrode 22 and a metal material charged into the furnace shell 16 is adjustable.

The furnace roof 20 is constituted as being movable in a vertical direction relative to the furnace shell 16 and being turnable in a horizontal direction by a lifting apparatus and a turning apparatus, which are not illustrated. The furnace roof 20 is capable of being moved and turned to open the charging opening 18 of the furnace shell 16 to charge a metal material into the furnace shell 16.

The electric arc furnace 10 in the present embodiment is an EBT furnace, in which a portion of the furnace bottom portion 14 protrudes outwards in a radial direction further than the circumferential wall portion 12 of the furnace shell 16 to form a protruding portion 26 with a small gradient (here, substantially horizontal), and on the protruding portion 26 is provided a tapping hole (steel tapping hole) 27 passing therethrough in vertical, as illustrated in FIG. 2.

A molten metal material (molten steel) in the furnace shell 16 is tapped toward a ladle 23 (see FIG. 1) via the tapping hole 27 by tilting the entire furnace shell 16.

A slag door 29 is provided at a position (symmetrical position) that is opposite to the tapping hole 27 in the radial direction.

Figure 7A:
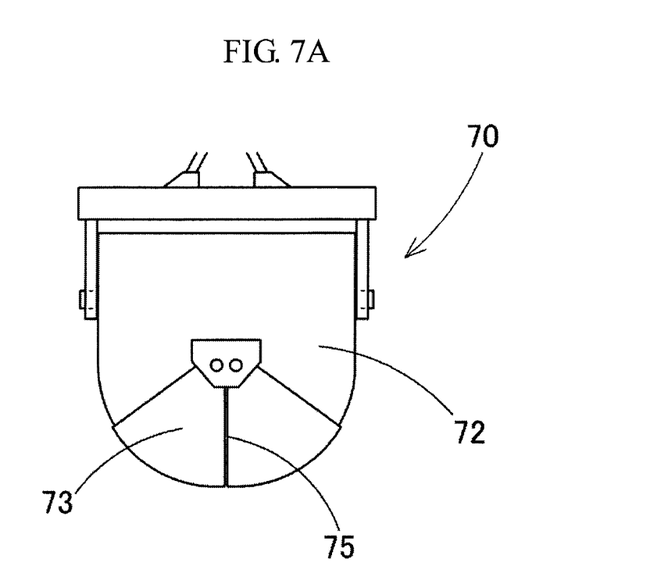
FIG. 7A to FIG. 7C are explanation views illustrating the content of the operation method.

Specifically, as illustrated in FIG. 7A, the slag door 29 is provided on a line connecting a center O of the furnace shell 16 to the center of the tapping hole 27, so as to pass through the circumferential wall portion 12 of the furnace shell 16 in an inward and outward direction.

In the present embodiment, slag produced during a melting operation can be discharged to the outside via the slag door 29 by tilting the entire furnace shell 16 in the opposite direction from that in the case of tapping.

In the electric arc furnace 10 in the present embodiment, the furnace shell 16 is tiltable, and is rotatable relative to the furnace roof 20 and the electrodes 22 in a state where they are fixed in a circumferential direction.

In FIG. 1, a reference numeral 34 is a tilting body that tilts while supporting the furnace shell 16 to make the furnace shell 16 tilt. The tilting body is tiltably supported by a furnace stand 36 that is provided on the ground.

Engaging teeth are provided on an upper surface of the furnace stand 36 that supports the tilting body 34, and on a lower surface of a leg portion 37, which has a convex shape toward downwards, of the tilting body 34 being in contact therewith. Due to engagement between the engaging teeth with each other, the tilting body 34 is prevented from deviating relative to the furnace stand 36 during a tilting operation.

The tilting body 34 includes a tilting bed 35 for supporting the furnace shell 16, and the furnace shell 16 is supported by the tilting bed 35 of the tilting body 34 via the rotating apparatus 32 described later.

In the present invention, the rotating apparatus may be configured as below.

That is, the rotating apparatus may be configured to include 1) a support unit that rotatably supports a furnace shell above a tilting body; 2) a guide rail that is provided between the furnace shell and the tilting body, and guides the furnace shell to rotate around a center axis thereof; 3) a driven unit that is provided on a furnace shell side, and receives rotation drive force; 4) a drive member that is provided on a tilting body side, and is engaged with the driven unit to transmit rotation drive force to the driven unit; and 5) a drive source that is provided on the tilting body side, and produces drive force. The rotating apparatus may be provided to tilt integrally with the tilting body.

In the present embodiment, the rotating apparatus is specifically configured as below.

First, a tilting mechanism will be described.

As illustrated in FIG. 2, one end of a drive cylinder 38 is rotatably connected to a right end in the drawing of the tilting body 34, and the other end of the drive cylinder 38 is rotatably connected to the ground side. When the drive cylinder 38 extends, the tilting body 34 is tilted along with the furnace shell 16 so that a left side in the drawing be downwards and a right side be upwards. As a result, molten steel in the furnace shell 16 is tapped toward the ladle 23 via the tapping hole 27.

Figure 3:
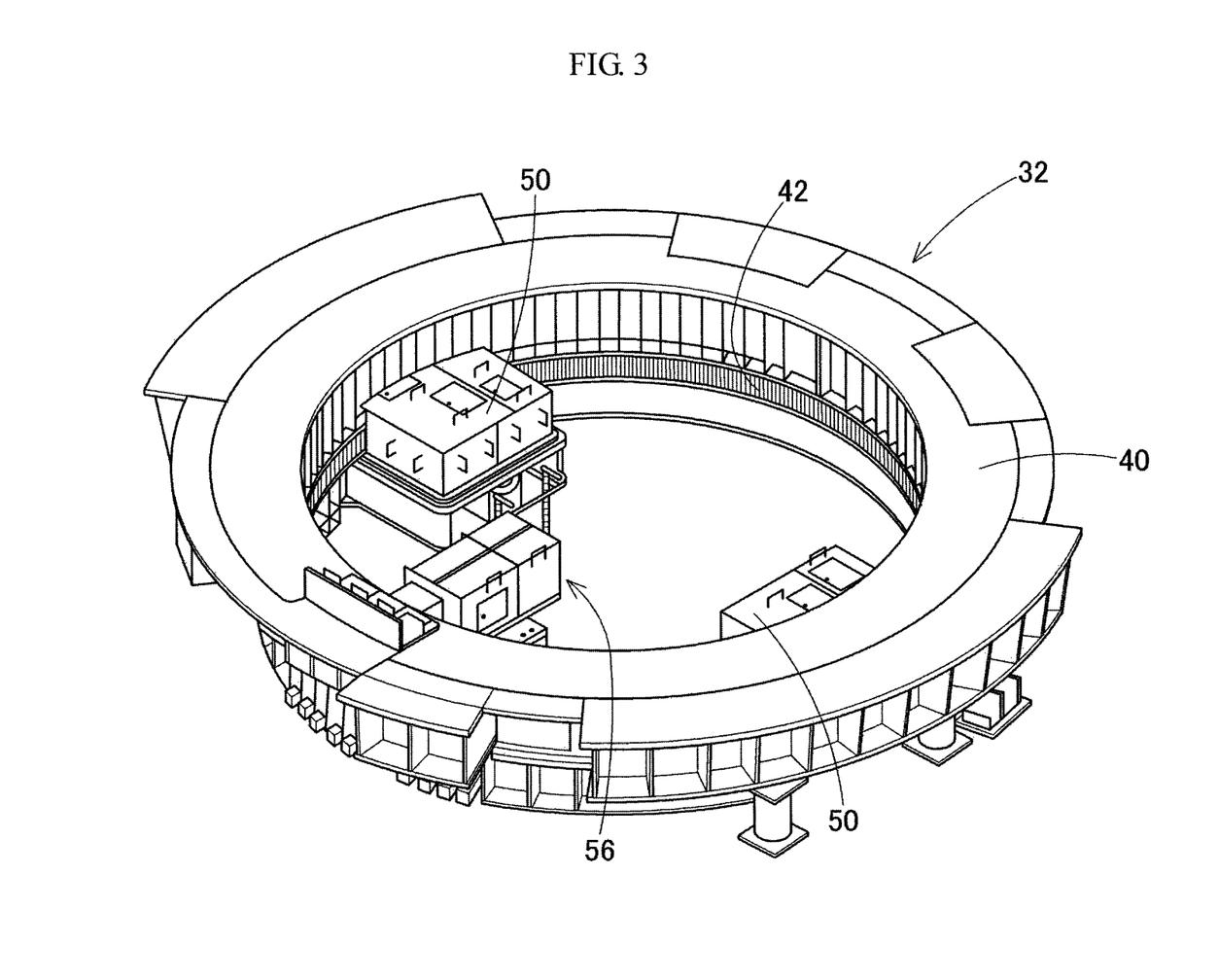
FIG. 3 is an entire perspective view of a rotating apparatus in FIG. 1.
Figure 4:
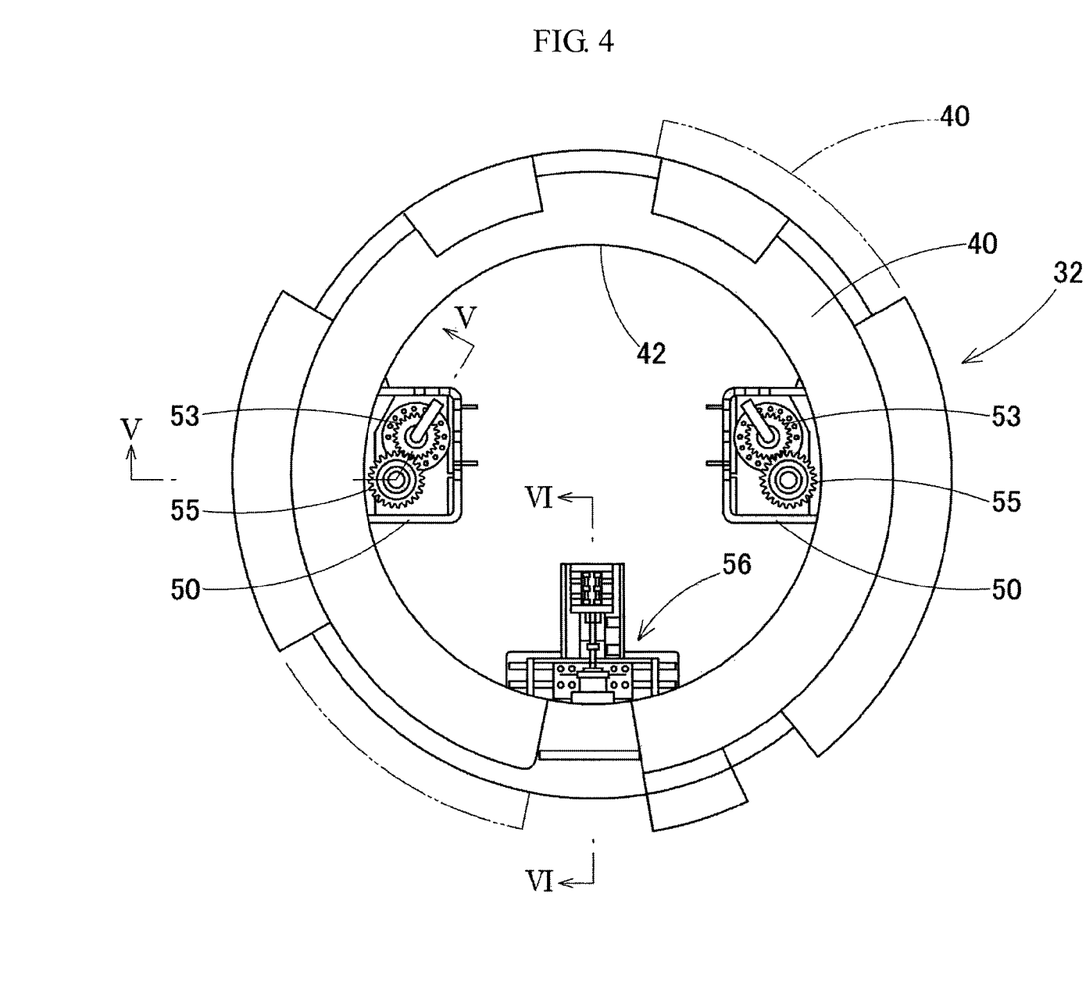
FIG. 4 is an entire plan view of the rotating apparatus.

FIG. 3 illustrates an entire perspective view of the rotating apparatus 32 in the present embodiment, and FIG. 4 illustrates a plan view thereof.

The rotating apparatus 32 includes a circular ring-shaped support frame 40 with multiple upstanding walls, and the furnace shell 16 is mounted on and fixed to an upper surface of the circular ring-shaped support frame 40.

A ring-shaped gear 42 is provided on a lower surface of an inner circumferential portion of the ring-shaped support frame 40, and teeth are provided along a circumferential surface of an inner circumference of the ring-shaped gear 42.

Figure 5:
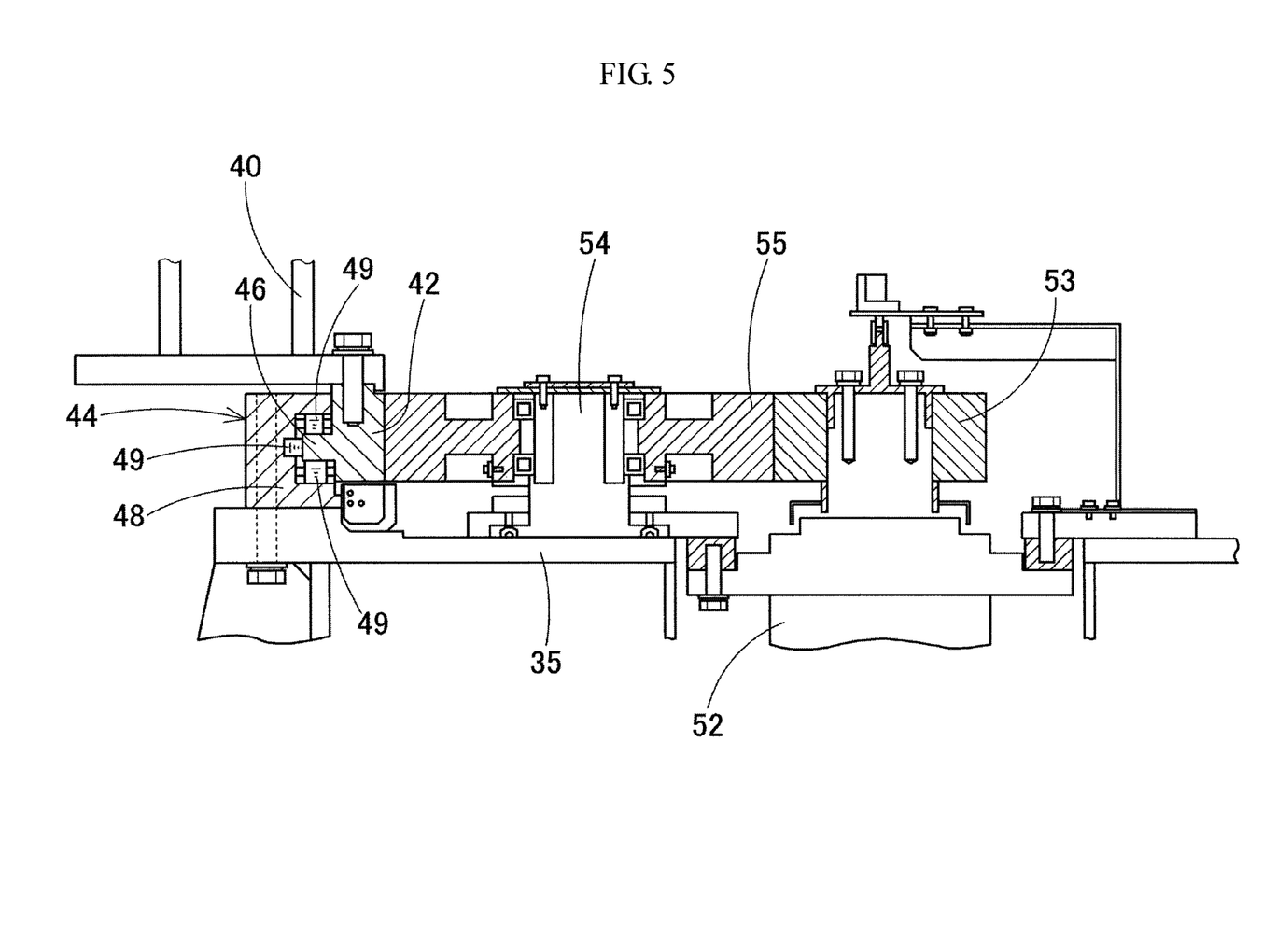
FIG. 5 is a V-V cross-sectional view in FIG. 4.

In contrast, as illustrated in FIG. 5, an outer circumferential middle portion of the ring-shaped gear 42 protrudes outwards in a square cross-sectional shape, and forms an inner race portion 46 of a bearing member 44.

An outer race portion 48 with a C-shaped cross-section is provided to surround the inner race portion 46, and roller bearings 49 are provided between a concave surface of the outer race portion 48 and a convex surface of the inner race portion 46, that is, upper and lower surfaces and an outer circumferential end surface.

Owing to such a structure, the circular ring-shaped support frame 40 is supported by the bearing member 44 and the like and is rotatable around a ring center thereof in a plane parallel with the tilting bed 35. Accordingly, the furnace shell 16 supported by the rotating apparatus 32 is rotatable relative to the electrodes 22 around a center axis of the furnace shell 16 as a rotational center.

Gear boxes 50 (see FIG. 4) are provided on the tilting bed 35 at radially symmetrical positions inside the ring of the circular ring-shaped support frame 40, and thereinside are provided gears. In FIG. 5, a hydraulic motor 52 is provided as a drive source on the tilting bed 35 side, and on an output shaft thereof is mounted a gear 53. The gear 53 meshes with a gear 55 that is rotatably supported by a shaft 54 vertically arranged on the tilting bed 35, and the gear 55 meshes with the teeth of the ring-shaped gear 42.

Accordingly, when the hydraulic motor 52 is made rotate in a clockwise direction or a counter-clockwise direction, the circular ring-shaped support frame 40 is also rotated in the clockwise direction or the counter-clockwise direction via the gears 53, 55, and 42.

In the present embodiment, the circular ring-shaped support frame 40, the gear 42, and the bearing member 44 serve as the support unit, and the inner race portion 46 and the outer race portion 48 of the bearing member 44 among them also serve as the guide rail.

The teeth of the gear 42 serves as the driven unit, the gears 55 and 53 serve as the drive unit, and the hydraulic motor 52 serves as the drive source.

In the present embodiment, the circular ring-shaped support frame 40, that is, the furnace shell 16 can be rotated by the hydraulic motor 52, in a range of 60° in the counter-clockwise direction from an original position at which the tapping hole 27 of the furnace shell 16 faces a tapping yard as illustrated in FIG. 4.

Figure 6:
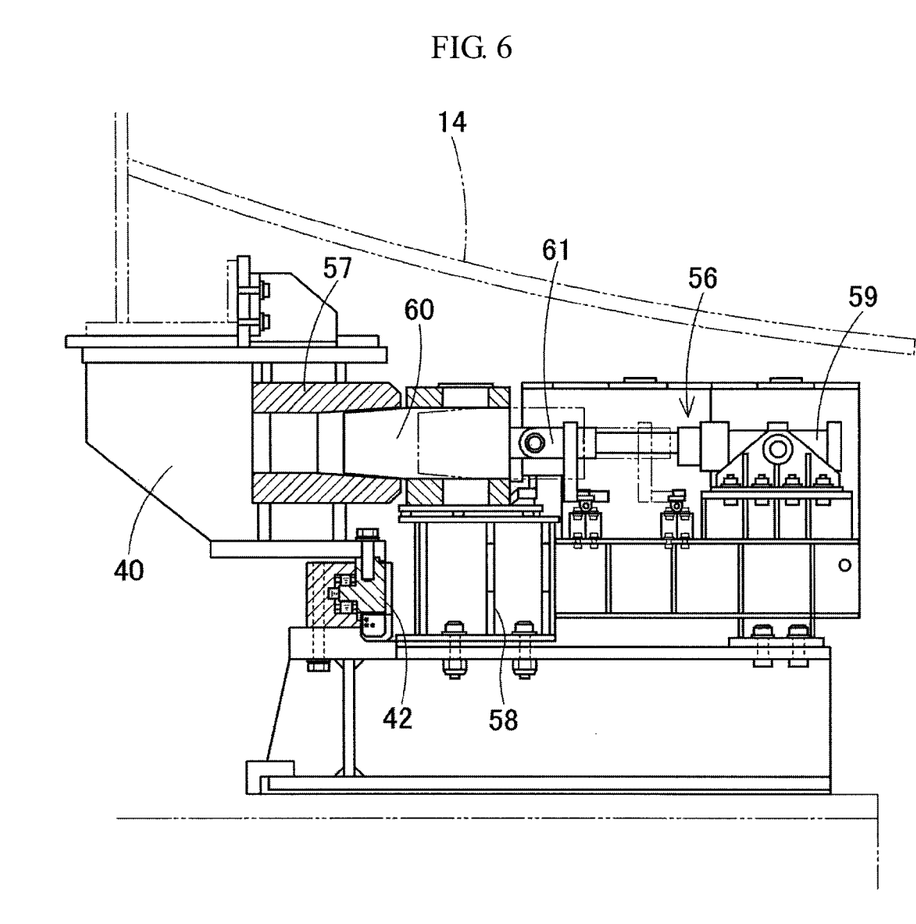
FIG. 6 is a VI-VI cross-sectional view in FIG. 4.

A stopper mechanism 56 is provided at a middle position in a circumferential direction of the circular ring-shaped support frame 40 between both of the gear boxes 50. The details of the stopper mechanism 56 are illustrated in FIG. 6. In FIG. 6, a sheath member 57 is provided inwards in the circular ring-shaped support frame 40. The sheath member 57 is a circular cylindrical body, an inner side half of which is made in a tapered shape in which the inner circumference gradually increases inwards.

In contrast, on a stand 58 of the tilting bed 35 side is provided a plug member 60, which is straightly moved forwards and backwards in an inward and outward direction by a drive cylinder 59. The plug member 60 is a circular columnar body, a tip end portion of which positioned on the outside side has a diameter gradually decreasing toward the tip end, and a rear end of the plug member 60 is connected to a rod 61 of the drive cylinder 59.

When the circular ring-shaped support frame 40 is at the original position, as illustrated in FIG. 6, the sheath member 57 faces the plug member 60, and when the plug member 60 is made move forwards by the drive cylinder 59, the plug member 60 enters the sheath member 57 and the tapered tip end portion of the plug member 60 is fitted into the tapered half portion of the sheath member 57. Accordingly, rotation of the circular ring-shaped support frame 40, that is, the furnace shell 16 is reliably restricted, and in this state, the furnace shell 16 can be tilted for tapping or tilted for discharging slag.

Next, a method of operating the electric arc furnace 10 to melt a metal material will be described with reference to FIG. 7A to FIG. 7C and FIG. 8A to FIG. 8F.

Typically, a metal material such as scrap is charged into a furnace in multiple times. In this example, the metal material is charged into the furnace in twice.

Figure 7B:
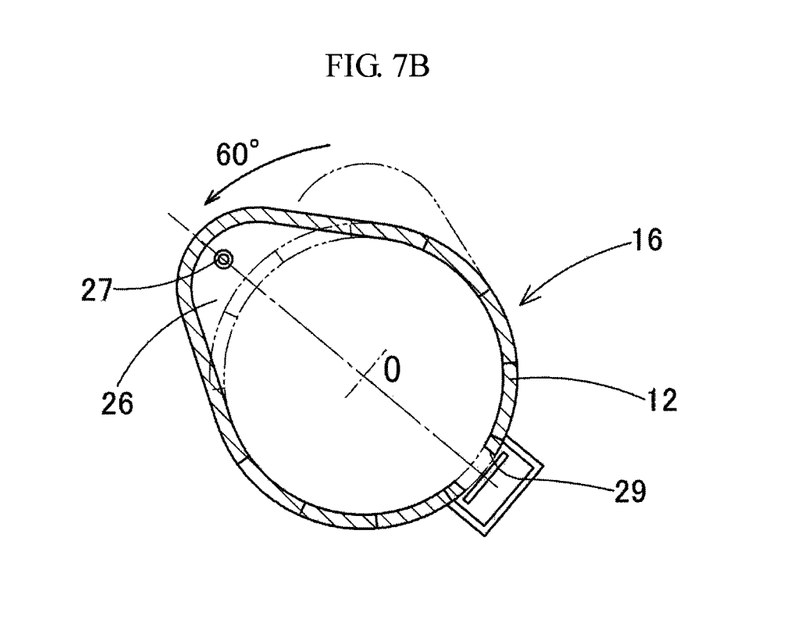
Figure 7C:
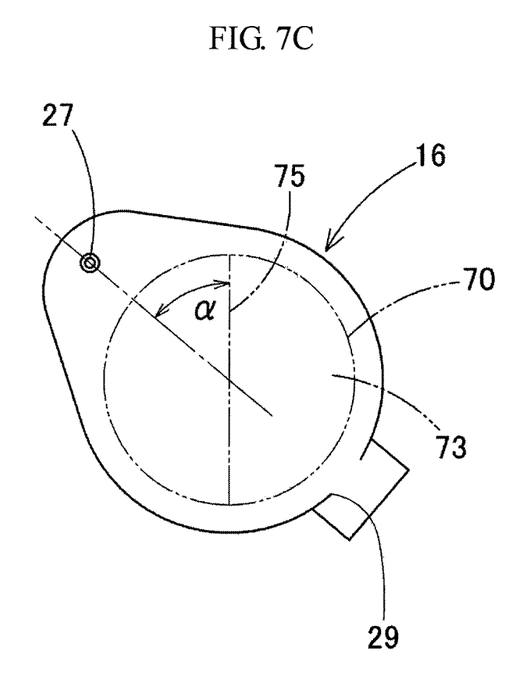

FIG. 7A to FIG. 7C illustrates a state of this charging step.

A reference numeral 70 represents a scrap bucket which has a circular cylindrical trunk portion 72 as a body in an upper portion, and an opening-and-closing door 73 that is opened while being split in half at the center to either side in a bottom portion. A reference numeral 75 represents a seam at a tip end at a closing side of the opening-and-closing door 73.

The opening-and-closing door 73 is connected to a hoist, which is not illustrated, via a wire, and when the wire is lifted or lowered by the hoist, the opening-and-closing door 73 is opened or closed in such a state of being split in half at the center.

In the charging step, first, the charging opening 18 of the furnace shell 16 is opened by turning and withdrawing the furnace roof 20, and the scrap bucket 70 holding a metal material is moved to a position above the charging opening 18 by a crane.

When the furnace shell 16 is positioned at the original position, the furnace shell 16 and the scrap bucket 70 have a positional relationship in which a line connecting a center of the furnace shell 16 to a center of the tapping hole 27 coincides with an extension line of the seam 75 of the opening-and-closing door 73 in the scrap bucket 70. Therefore, before the metal material in the scrap bucket 70 is charged into the furnace shell 16, the furnace shell 16 is rotated by the rotating apparatus 32 to a predetermined position in advance.

In the present embodiment, the furnace shell 16 is rotated from the original position in the counter-clockwise direction, and the rotation of the furnace shell 16 is stopped at a position where an angle formed between the line connecting the center O of the furnace shell 16 to the center of the tapping hole 27 and the extension line of the seam 75 of the opening and closing door 73 in the scrap bucket 70, that is, an intersection angle α as illustrated in FIG. 7C, is 60°.

The opening-and-closing door 73 is opened while being split in half after the rotation of the furnace shell 16 is stopped, and the metal material in the scrap bucket 70 falls downwards via an opening that is formed at that time, whereby the metal material is charged into the furnace shell 16 below the scrap bucket 70.

At this time, since the tapping hole 27 is positioned with a long distance in the circumferential direction from the seam 75 of the opening-and-closing door 73, that is, the tapping hole 27 is positioned with a long distance from a location to which the collected powdery metal material falls, it can prevent the powdery metal material falling from the scrap bucket 70 from accumulating in the vicinity of the tapping hole 27 in a large amount.

In the present embodiment, since the slag door 29, which is positioned opposite to the tapping hole 27 in a radial direction, is also positioned with a long distance in the circumferential direction from the seam 75 of the opening-and-closing door 73, it can prevent the powdery metal material falling from the scrap bucket 70 from accumulating in the vicinity of the slag door 29 in a large amount.

Figure 8A:
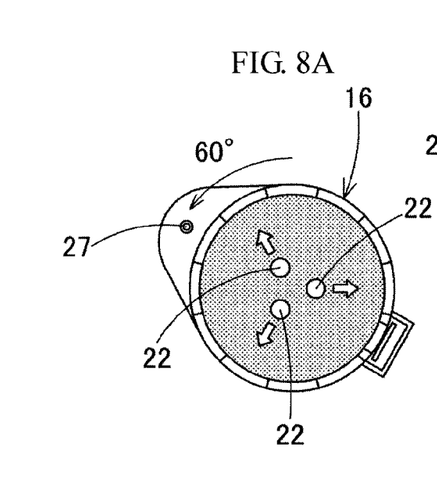
FIG. 8A to FIG. 8F are explanation views illustrating the content of the operation method following FIG. 7.

After the completion of the charging of the metal material, the furnace roof 20 and the electrodes 22 are placed above the furnace shell 16, and arcs are produced from the tip ends of the electrodes 22 downward to preferentially melt the metal material positioned around the tip end portions of the electrodes 22. The electrodes 22 are made bore into the metal material (this step is referred to as a boring step hereinafter). FIG. 8A illustrates a state in which the boring is performed.

Figure 8B:
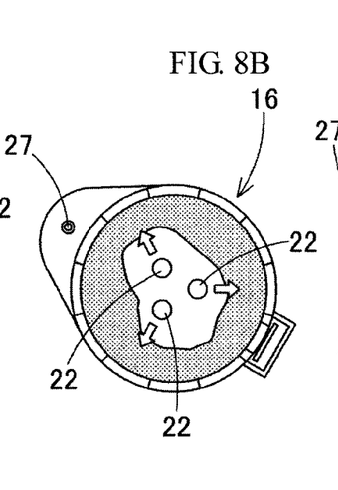

When the boring is completed and the electrodes 22 reach the vicinity of a furnace bottom portion 14, the material around the electrodes 22 is melted (FIG. 8B).

When unmelted metal material around the electrodes 22 is disappeared as a result, the furnace shell 16 becomes rotatable relative to the electrodes 22. Portions in the furnace illustrated by half-tone dots in the drawing represent the unmelted metal material, and portions illustrated by white backgrounds represent the molten metal material. In this stage, extremely ununiform melting has not occurred yet.

Figure 8C:
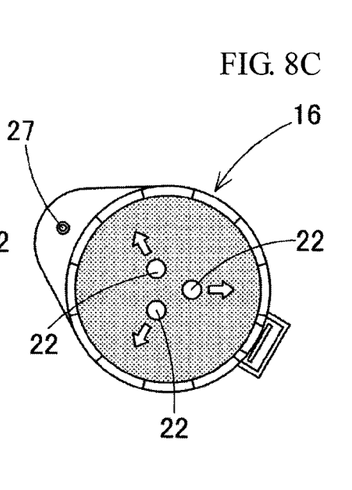

After the volume of unmelted metal material in the furnace is reduced due to melting, the remainder of the metal material is additionally charged (FIG. 8C).

At this time, since the furnace shell 16 has been rotated by 60° from the original position in the counter-clockwise direction in the drawing, the furnace roof 20 is turned and withdrawn in a state where the position of the furnace shell 16 remains unchanged, and then the metal material falls into the furnace from the scrap bucket 70.

Also in the additional charging of the material, the tapping hole 27 and the slag door 29 are positioned with a long distance from the seam 75 of the opening-and-closing door 73, that is, the tapping hole 27 and the slag door 29 are positioned with a long distance from a location to which the collected powdery metal material falls, it can prevent the powdery metal material falling from the scrap bucket 70 from accumulating in a large amount in the vicinities of the tapping hole 27 and the slag door 29.

Figure 8D:
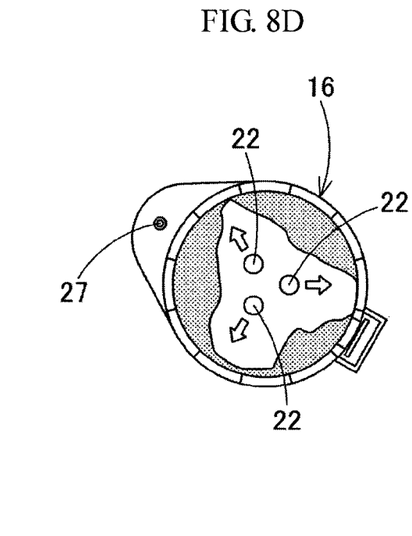

Thereafter, the furnace roof 20 and the electrodes 22 are placed above the furnace shell 16, and the melting of the metal material is performed again by arc discharge including the boring step, then, the metal material is ununiformly melted by forming three hot spots and three cold spots in the circumferential direction of the furnace shell 16 (FIG. 8D).

Figure 8E:
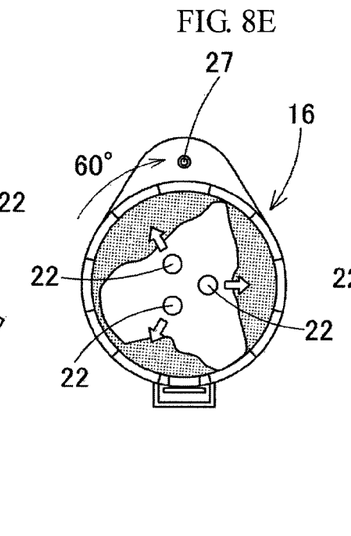
Figure 8F:
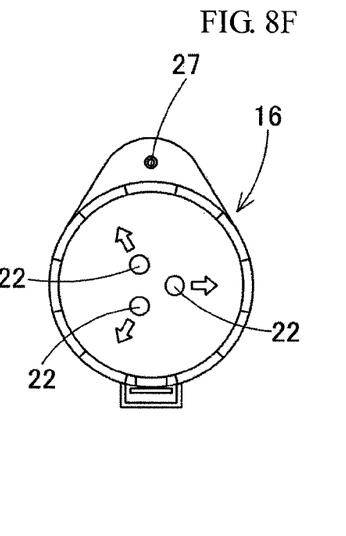

Then the unmelted metal material is moved to the hot spot by rotating the furnace shell 16 by 60° in the clockwise direction in the drawing to the original position, in a state where the furnace roof 20 is separated upwards (FIG. 8E). In this state, the furnace roof 20 is closed and the discharge from the electrodes 22 is started, whereby the unmelted metal material can be effectively heated by the electrodes 22. As illustrated in FIG. 8F, the melting of the metal material charged into the furnace is completed.

As described above, according to the present embodiment, since the position to which a powdery metal material falls from the scrap bucket 70 is separated and deviates in the circumferential direction from the positions of the tapping hole 27 and the slag door 29 of the furnace shell 16 (positions in a plan view), it can prevent the powdery metal material falling from the scrap bucket 70 from accumulating in the vicinity of the tapping hole 27 and in the vicinity of the slag door 29.

Accordingly, it is possible to solve the problem that the powdery metal material accumulates in the vicinity of the tapping hole 27 and remains unmelted during melting, and the problem that the powdery metal material accumulating in the vicinity of the slag door 29 turns into an uneasy-to-melt material (powder compact material) due to air infiltrating during the discharge of slag.

In the present embodiment, the charging step of charging the metal material is performed in a positional relationship in which an intersection angle of 60° is formed between a direction of the line connecting the center of the furnace shell 16 to the center of the tapping hole 27 and the extension direction of the seam 75 of the opening-and-closing door 73 in the scrap bucket 70. However, the intersection angle may be set to another angle. The charging step is preferably performed in a positional relationship in which both of the lines intersect each other at an angle of at least 10° or greater, preferably at an angle of 30° or greater, and more preferably at an angle of 60° or greater.

In the present embodiment, during melting of the metal material after the charging step, a rotating step of rotating the furnace shell 16 is performed, and thus the metal material originally placed at a cold spot can be moved to a hot spot and the metal material originally placed at a hot spot can be moved to a cold spot. As a result, the metal material can be uniformly melted in the furnace shell 16.

The embodiment of the present invention has been described in detail but it is merely an example. In the present embodiment, the furnace is an EBT furnace. However, depending on situations, the present invention is applicable to a different type of electric arc furnace, and to an electric arc furnace with two electrodes, four electrodes, or more than four electrodes.

The present invention is applicable to a method of operating an electric arc furnace that melts metal other than steel. As such, the present invention can be realized in various modified forms insofar as they do not depart from the gist thereof.

The present application is based on the Japanese patent application No. 2014-225631 filed on Nov. 5, 2014, which contents are incorporated herein by reference.

DESCRIPTION OF REFERENCE NUMERALS

10: electric arc furnace
12: circumferential wall portion
14: furnace bottom portion
16: furnace shell
18: charging opening
20: furnace roof
22: electrode
26, 208: protruding portion
27, 210: tapping hole
29: slag door
32: rotating apparatus
70: scrap bucket
73: opening-and-closing door
75: seam

What is claimed is:
1. A method of operating an electric arc furnace, wherein the electric arc furnace comprises:
(a) a furnace shell that includes a cylindrical circumferential wall portion, a furnace bottom portion and a tapping hole;
(b) a furnace roof that has a plurality of electrodes provided so as to face downwards; and
(c) a rotating apparatus that rotates the furnace shell around a vertical axis relative to the electrodes,
wherein the method comprises:
a charging step of, above the furnace shell, opening an opening-and-closing door on a bottom portion of a scrap bucket, which contains a metal material, to form an opening, and falling the metal material into the furnace shell via the opening, and
a melting step of melting the metal material, and
wherein the furnace shell is rotated by the rotating apparatus until achieving a positional relationship in which a direction of a line connecting a center of the furnace shell to a center of the tapping hole intersects an extension direction of a seam at a closing side of the opening-and-closing door of the scrap bucket, then the opening-and-closing door of the scrap bucket is opened in this positional relationship, and the metal material is charged.

2. The method of operating an electric arc furnace according to claim 1, wherein the furnace shell further comprises a slag door provided on the line connecting the center of the furnace shell to the center of the tapping hole.

3. The method of operating an electric arc furnace according to claim 2, further comprising:
a rotating step of rotating the furnace shell during the melting step after the charging step.

4. The method of operating an electric arc furnace according to claim 1, further comprising:
a rotating step of rotating the furnace shell during the melting step after the charging step.

* * * * *